Feb. 9, 1954  J. SEGRE  2,668,574
APPARATUS FOR MOLDING CORRUGATED ASBESTOS-CEMENT SHEETS
Filed Feb. 7, 1952  2 Sheets-Sheet 1
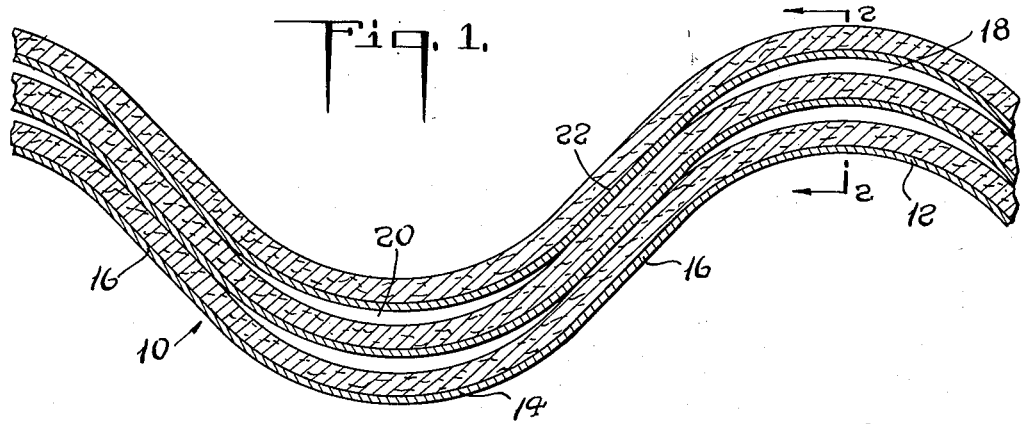
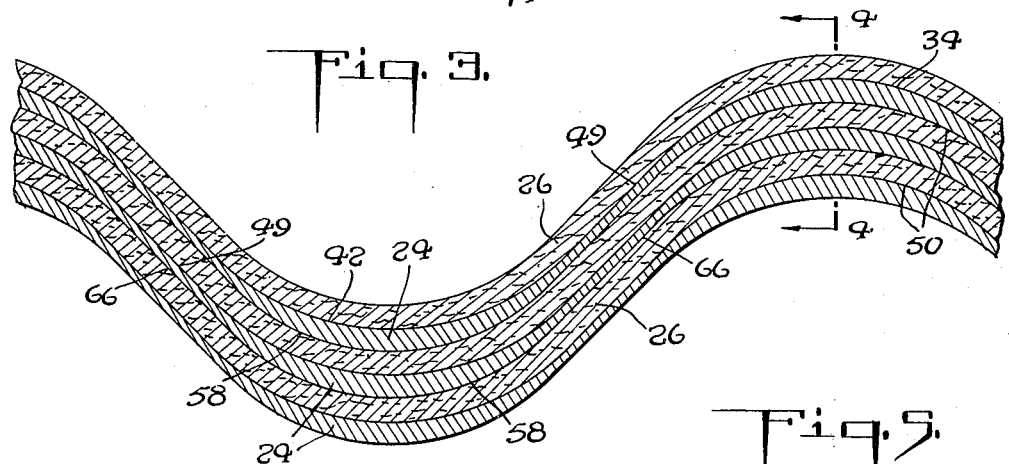
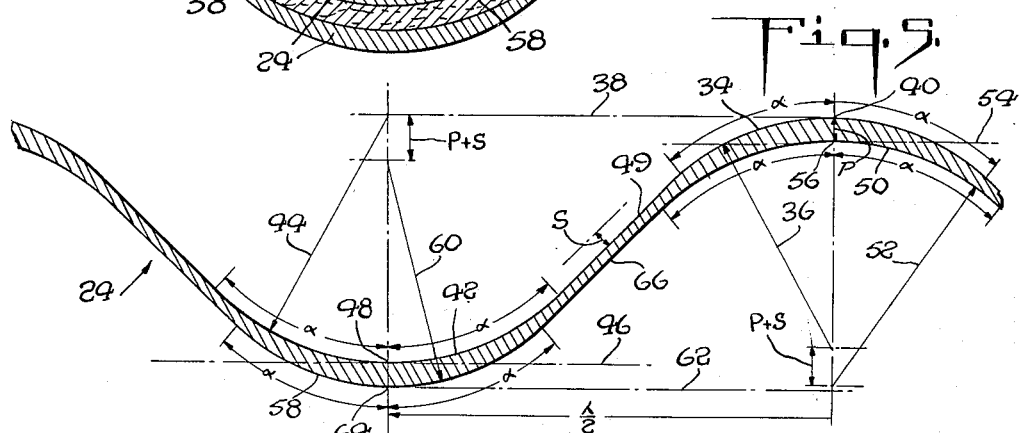
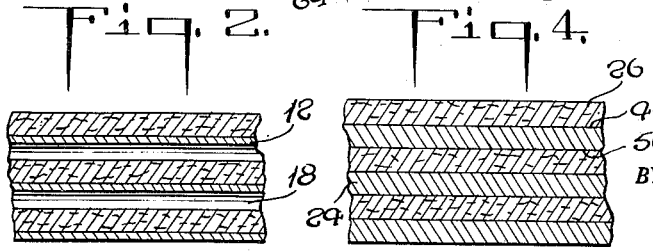
INVENTOR.
JAMES SEGRE
BY
ATTORNEY

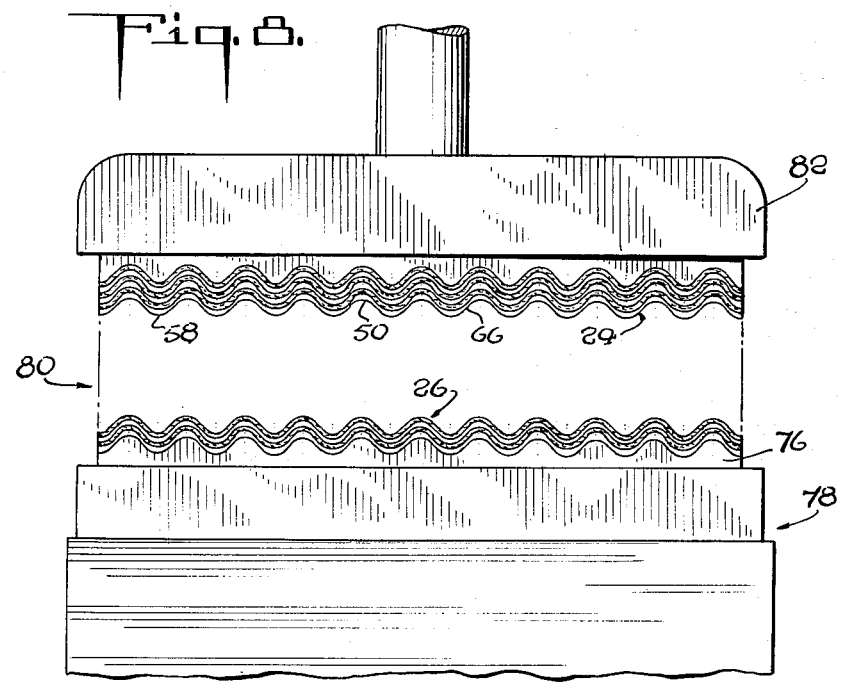
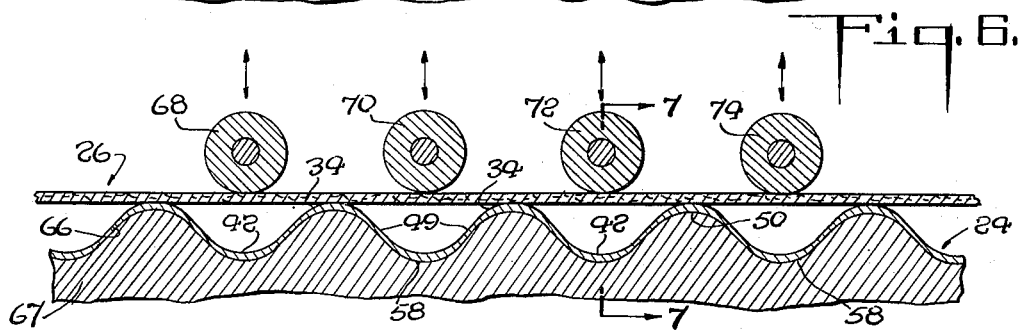
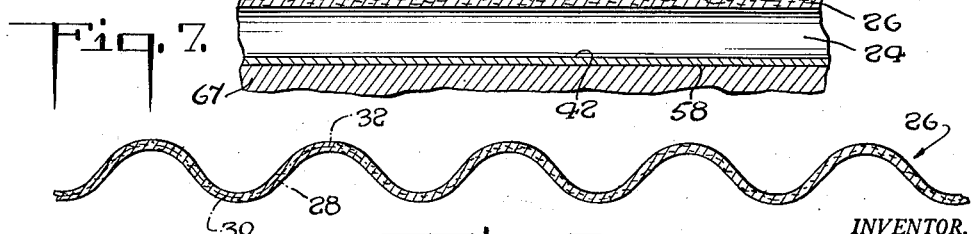
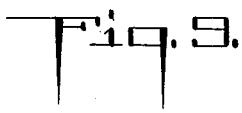
INVENTOR.
JAMES SEGRE
BY
ATTORNEY

Patented Feb. 9, 1954

2,668,574

UNITED STATES PATENT OFFICE 2,668,574

APPARATUS FOR MOLDING CORRUGATED ASBESTOS-CEMENT SHEETS

James Segre, New York, N. Y.

Application February 7, 1952, Serial No. 270,407

4 Claims. (Cl. 154—30)

This invention is concerned with a process and apparatus for molding corrugated asbestos-cement sheets, i. e. sheets having alternate parallel ridges and grooves. More particularly, my invention pertains to molding platens for use in the manufacture of corrugated asbestos-cement sheets and to a method of employing such platens.

Specifically, my invention constitutes an improvement of a current method for making corrugated asbestos-cement sheets pursuant to which a flat sheet of asbestos-cement, obtained by any standard process, as for example that shown in United States Letters Patent No. 2,503,466, issued April 11, 1950 to William Bernard et al. for Apparatus for Manufacturing Cement Asbestos Board, is laid, while still plastic, i. e. damp, on a molding platen, the profile of whose top surface is the same as the desired profile for the bottom surface of the corrugated sheet. The sheet is forced against the platen in a forming operation which can be practiced by hand or machine, the latter being exemplified, for instance, by United States Letters Patent No. 1,868,645 to Scheeders-Van Kerchove, issued July 26, 1932 for Apparatus for Simultaneously Corrugating and Trimming Sheets of Asbestos-Cement and the like in a Plastic Condition, and No. 2,210,985 to Magnani, issued August 13, 1940 for Method for Corrugating Sheets. The molding platen and the superimposed formed plastic asbestos-cement sheet are transferred to a drying space where the associated platens and sheets are stacked on top of one another to conserve room. The sheets are permitted to stand until the cement has set and the sheets are dry and rigid. Thereupon the platens and sheets are removed from the stack, the sheets separated from the platens and the platens cleaned for subsequent use.

At present, molding platens are fabricated from sheet metal, e. g. sheet steel, the sheet metal being of uniform thickness and being shaped from the flat, e. g. by pressing or rolling, to provide a top surface whose profile matches the desired profile of the bottom surface of the corrugated asbestos-cement sheet. Because of the uniform and substantial thickness of flat asbestos-cement sheets, the top surface of a corrugated sheet made therefrom has a profile which is an appreciable mismatch of the profile of the bottom surface of the corrugated sheet, and therefore, of the profile of the top surface of the corrugated platen. Moreover, because the sheet metal platen also has an appreciable and uniform thickness, the profile of the bottom surface of the platen is substantially different from the profile of the top surface of the molded asbestos-cement sheet, so that the profile of the top of the sheet is an even worse mismatch of the profile of the bottom of the platen.

Accordingly, when, in accordance with current practice, corrugated platens and sheets are stacked for drying, the bottom of each platen does not nest snugly into the top of the underlying sheet so that the pressure on the damp asbestos-cement sheets is highly irregular during drying. There is no pressure between the sheets and platens at the tops of the ridges and the bottoms of the grooves (indeed there is a space between the sheets and platens at these regions) and all pressure is concentrated at the slanting walls joining the ridges and grooves. This results in several disadvantages well known to skilled workers in the art as, for example, non-uniform thickness, density, strength and appearance.

It is an object of my invention to provide a method and apparatus of the character described which overcomes these disadvantages.

More specifically, it is an object of my invention to provide a method and apparatus of the character described which will produce a corrugated asbestos-cement sheet of uniform thickness, density, strength and surface appearance.

It is a further object of my invention to provide a method and apparatus for manufacturing a corrugated asbestos-cement sheet which has been compacted during drying whereby to increase its density and strength, without however, losing uniformity of thickness or any other desirable qualities.

Other objects of my invention will in part be obvious and in part will be pointed out hereinafter.

My invention accordingly consists in the features of construction, combinations of elements, arrangements of parts and series of steps which will be exemplified in the construction and method hereinafter described and of which the scope of application will be indicated in the appended claims.

In the accompanying drawings in which are shown various possible embodiments of my invention, Fig. 1 is a sectional view through a stack of corrugated asbestos-cement sheets and conventional platens, the same being taken transverse to the length of the corrugations;

Fig. 2 is a sectional view taken substantially along the line 2—2 of Fig. 1;

Fig. 3 is a view similar to Fig. 1, but showing platens constructed in accordance with the present invention;

Fig. 4 is a sectional view taken substantially along the line 4—4 of Fig. 3;

Fig. 5 is a transverse sectional view through a platen of my invention and indicating certain critical dimensions;

Fig. 6 is a fragmentary transverse sectional view through a forming machine which is conventional save for platens embodying my invention;

Fig. 7 is a sectional view taken substantially along the line 7—7 of Fig. 6;

Fig. 8 is an end view of a press being used with my platens during a drying operation; and Fig. 9 is a transverse sectional view through a corrugated asbestos-cement sheet which has been made with the aid of my platens.

Referring now in detail to the drawings, and more particularly to Figs. 1 and 2, the reference numeral 10 denotes a corrugated sheet metal platen of conventional contour, that is to say, a standard platen which does not embody my invention. Said platen is manufactured, as by pressing and rolling, from flat pieces of sheet metal of uniform thickness. In accordance with custom, the ridges 12 and grooves 14 are of substantially the same shape, that is to say, the radius of curvature of the ridges is substantially the same as the radius of curvature of the grooves. The profile of the platen constitutes circular arcs joined by straight slanting walls 16. All of the ridges and grooves are of the same height. It will be understood that the angular length of the circular arcs, the radii of said arcs and the length and inclination of the sloping walls may vary, although once a given set of such dimensions has been selected there is a strong tendency to retain the same due to the large investment in platens.

As noted above, when a platen of this construction is employed, a still damp, plastic, flat asbestos-cement sheet is placed thereon and is formed to follow the top surface of the platen, that is to say, the plastic sheet is forced against the platen so that the profile of its bottom surface exactly matches the profile of the top surface of the platen. However, the profile of the top surface of the sheet will not match the profile of the bottom surface of an overlying platen. The radii of curvatures and the centers of the circular arcs are such that there is a crescent space 18 between the top of each ridge in a sheet and the bottom of each groove in an overlying platen. Similarly there is a crescent space 20 between the bottom of each groove in a sheet and the top of each ridge in an overlying platen. Accordingly, each platen but the lowermost rests on the underlying corrugated sheet only along the sloping walls 16 joining the circular arcs, the area of contact being indicated in Fig. 1 by the reference numeral 22. All pressure is concentrated along this region so that this part of the corrugated sheet becomes thinner and more compact than the remainder thereof and often develops cracks. Moreover, due to this localized area of contact it is not practical to subject a stack of said platens and sheets to an external, e. g. machine, pressure.

The present invention obviates the foregoing drawback by providing a platen 24 of unique shape which is such that the upper surface of the platen consists of a series of ridges and grooves that exactly match the desired undersurface of a corrugated sheet and the undersurface of the platen consists of a differently shaped series of ridges and grooves that exactly match the desired upper surface of the corrugated sheet, account being taken of the sheet's thickness which is maintained uniform.

In the preferred form of my invention the corrugated platen is so contoured that a corrugated asbestos-cement sheet 26 formed with its aid has a profile whose median line 28 (the midway line of a transverse cross-section of the sheet) constitutes alternate upwardly concave and upwardly convex arcs 30, 32, respectively, said arcs being of approximately the same radius so that the upwardly convex arcs and upwardly concave arcs on the same surface of the sheet are of different diameter, the radius of curvature of the upwardly convex arcs (grooves) on the bottom surface of the sheet being less than that of the upwardly concave arcs (ridges) on said surface and the radius of curvature of the upwardly concave arcs (grooves) on the top surface exceeding those of the upwardly convex arcs (ridges) on said surface.

More specifically, I achieve my invention by providing a corrugated platen of varying thickness. Said platen is desirably manufactured by a process which does not depend upon changing the shape of sheet material of uniform thickness but, rather, by a process which enables an object of varying thickness to be formed. For example, the platen can be made by forging or by molding, the latter preferably being used. Conveniently, the material of the platen may be a synthetic plastic so that the platen can be fabricated, for instance, by die-molding, e. g. low pressure or flash molding.

In order for a platen embodying my invention to obtain the exactly matching, i. e. nesting fit with a corrugated sheet in the manner hereinabove described, the platen is specially shaped as best illustrated in Fig. 5.

The top surface of said platen has a transverse profile consisting of a series of upwardly convex circular arcs 34 of the same radius of curvature 36, all of said arcs being tangent to a single straight line 38. The radius 36 at the center 40 of each arc is perpendicular to said common tangential line.

The transverse profile top surface of the platen also includes a series of upwardly concave circular arcs 42, all having the same radius 44 of curvature and all being tangent to a single straight line 46 parallel to the line 38. The radius 44 at the center 48 of each upwardly concave arc is perpendicular to the common tangential line 46.

The arcs of the two series alternate, that is to say, there is first an arc of one series and then one of another, e. g. first an upwardly convex arc 34, then an upwardly concave arc 42, then another upwardly convex arc, etc. All the arcs are of the same angular length 2α.

The transverse profile of the top surface of the platen further includes straight lines 49 joining the ends of adjacent arcs, each said line being a common tangent to the arcs at their ends.

The bottom surface has a transverse profile consisting of a series of upwardly convex circular arcs 50 of the same radius of curvature 52, all of the arcs being tangent to a single straight line 54 parallel to the line 38. The radius 52 at the center 56 of each arc is perpendicular to the tangent line 54.

The transverse profile of the bottom surface of the platen further includes a series of upwardly concave circular arcs 58 of the same radius of curvature 60, all of said arcs being tangent to a single straight line 62 parallel to the line 38. The radius 60 at the center 64 of each upwardly concave arc is perpendicular to the tangent line 62.

The arcs 50, 58 of the two series alternate, e. g. there is first an upwardly convex arc 50 and then an upwardly concave arc 58, then an upwardly convex arc, etc. The angular lengths of all the arcs 50, 58 are the same and are the same as those of the arcs 34, 42 of the transverse profile of the top surface.

The transverse profile of the bottom surface also includes straight lines 66 tangentially joining the ends of adjacent arcs and parallel to the lines 49.

Each upwardly convex arc 50 of the bottom transverse profile is paired with an upwardly convex arc 34 of the top transverse profile, and each upwardly concave arc 58 of the bottom transverse profile is paired with an upwardly concave arc 42 of the top transverse profile. The bottom arc of each pair is directly beneath and of the same angular length as the top arc of that pair and the centers of each pair of arcs lie in a line perpendicular to the tangential lines 38, 46, 54, 62.

The length of the radii of the various arcs are critically interrelated in accordance with my invention. Thus the radius 36 of every upwardly convex arc 34 of the top transverse profile is shorter by S than the radius 52 of the matching upwardly convex arc 50 of the bottom transverse profile where S is the thickness of the molded asbestos-cement sheet. The radius 44 of every upwardly concave arc 42 of the top transverse profile is longer by S than the radius 60 of the matching upwardly concave arc 58 of the bottom transverse profile.

In addition to the critical interrelationship of the lengths of the radii, the centers about which the radii are described are critically interrelated. The center about which the radius of each arc 34, 42 of the top transverse profile is described is P+S above the center about which the radius of the matching arc 50, 58 of the bottom transverse profile is described where P is the thickness of the platen at the centers 40, 48, 56, 64 of the matching upwardly convex and concave arcs.

When a plurality of platens such as described above are stacked with the crowns of the ridges and bases of the groves spaced vertically apart a predetermined distance equal to S the entire space between two adjacent platens will be of the same uniform thickness S.

By way of example and without in any manner limiting the invention I have set forth below typical values for the various dimensions of a platen constructed in accordance with my invention where S is six millimeters:

The radius 36 is forty-four millimeters. The radius 44 is fifty-one millimeters. The radius 52 is fifty millimeters. The radius 60 is forty-five millimeters. The distance between lines 38 and 46 is fifty-seven millimeters. The thickness P of the platen at the centers of the circular arcs is six millimeters. The distance between the centers of the two radii for matching pair of arcs (P+S) is twelve millimeters. The distance between the center of a pair of matching convex arcs and a pair of matching concave arcs, i. e. the distance λ/2 from the center of a ridge to the center of a groove in a direction transversely of the sheet (for example along the line 38) is eighty-eight point five millimeters. The length of all the circular arcs is 94°. The perpendicular distance between a pair of lines 49, 66 tangentially joining the ends of circular arcs is two point two millimeters.

In carrying out the method of my invention a flat asbestos-cement sheet 26 is formed in any conventional manner such that the thickness of the sheet is uniform. Before the sheet has had a chance to set, that is to say, while it is still damp and therefore pliable, and preferably very shortly after it has come out of the sheet-making machine, the sheet is placed upon a platen 24 embodying my invention and of the construction above described. Optionally, the platen may be supported on a block 67 whose upper surface is shaped to match the bottom surface of the platen. The sheet is forced into the grooves of the platen in accordance with any suitable method. For this purpose, for instance, I may provide a plurality of rollers 68, 70, 72, 74. These rollers may be depressed against the sheet in registry with grooves thereby causing the undersurface of the sheet to match the upper surface of the platen. The rollers can be manipulated by hand or by machine, an example of the latter being disclosed in the aforesaid Magnani patent.

Next, the platen with its superimposed corrugated asbestos-cement sheet is placed on the anvil 76 of a press 78. Optionally, the anvil may have its upper surface corrugated to match the bottom surface of the platen. Thereafter another platen with a superimposed corrugated asbestos-cement sheet is placed on the first platen-sheet pair and pair after pair of platens and sheets superimposed thereon to form a stack 80 of such pairs on the anvil. It will be observed that due to the peculiar configuration of the platen pursuant to my invention, the pressure exerted on any given sheet by the superimposed platen is uniform throughout the entire surface thereof. By virtue of this unique feature the stack can be compressed by bringing down the head 82 of the press and any desired amount of pressure can be exerted without noticeably deforming the resulting corrugated sheet. The uppermost sheet is covered by a bare platen and, optionally, the bottom surface of the head 82 is corrugated to match the top of said platen.

It thus will be seen that I have provided a process and apparatus for molding corrugated asbestos-cement sheets which achieve the several objects of my invention and meet the conditions of practical use.

As various possible embodiments might be made of the above invention and as various changes might be made in the embodiment above set forth, it is to be understood that all matter and steps herein described, or shown in the accompanying drawings, are to be interpreted as illustrative and not in a limiting sense.

Having thus described my invention, I claim as new and desire to secure by Letters Patent:

1. For use in molding corrugated asbestos-cement sheets of uniform thickness from a flat plastic asbestos-cement sheet of uniform thickness, a one-piece platen having a top transverse profile constituting a series of upwardly convex circular arcs all having the same radius of curvature and being tangent to a single straight line, the radius at the center of each arc being perpendicular to said line, said top transverse profile also constituting a series of upwardly concave circular arcs all having the same radius of curvature and being tangent to a second single straight line, the radius at the center of each upwardly concave arc being perpendicular to said second tangent line, the arcs of the two series alternating, the top transverse profile further constituting a group of straight lines joining the ends of adjacent arcs and tangent to the ends thereof, the bottom transverse profile constituting a series of upwardly convex circular arcs all having the same radius of curvature and being tangent to a third single straight line, the radius at the center of each upwardly convex circular arc of the bottom transverse profile being perpendicular to said third tangent line, the bottom transverse profile further constituting a series of upwardly concave circular arcs all having the same radius of curvature and being tangent to a fourth single straight line, the radius at the center of each upwardly concave arc of the bottom transverse profile being perpendicular to the fourth tangent line, all of said tangent lines being parallel to one another, the arcs of the two series in the bottom transverse profile alternating, the bottom transverse profile also constituting a group of straight lines tangentially joining the ends of adjacent arcs and parallel to the group of lines in the top transverse profile which tangentially join the ends of adjacent arcs therein, each upwardly convex arc of the bottom transverse profile being paired with an upwardly convex arc of the top transverse profile and each upwardly concave arc of the bottom transverse profile being paired with an upwardly concave arc of the top transverse profile, the bottom arc of each pair being directly beneath and of the same angular length as the top arc of that pair and the centers of each pair of arcs lying in a line perpendicular to the tangential lines, the radius of every upwardly convex arc of the top transverse profile being $S$ shorter than the radius of the matching upwardly convex arc of the bottom transverse profile where $S$ is the thickness of the molded asbestos-cement sheet, the radius of every upwardly concave arc of the top transverse profile being $S$ longer than the radius of the matching upwardly concave arc of the bottom transverse profile, the center about which the radius of every arc of the top transverse profile is described being $P+S$ above the center about which the radius of the matching arc of the bottom transverse profile is described where $P$ is the thickness of the platen at the centers of the matching arcs.

2. A platen as set forth in claim 1 wherein all of the arcs are of the same angular length.

3. A platen as set forth in claim 2 wherein the angular length of the arcs is about 45°.

4. A platen as set forth in claim 3 wherein the radii of the upwardly convex circular arcs of the top transverse profile are substantially equal to the radii of the upwardly concave circular arcs of the bottom transverse profile and the radii of the upwardly convex circular arcs of the bottom transverse profile are substantially equal to the radii of the upwardly concave circular arcs of the top transverse profile.

JAMES SEGRE.

References Cited in the file of this patent

UNITED STATES PATENTS

| Number | Name | Date |
|---|---|---|
| 1,283,630 | Bean et al. | Nov. 5, 1918 |
| 1,794,435 | Barth | Mar. 3, 1931 |